(12) United States Patent
Seo et al.

(10) Patent No.: US 10,491,068 B2
(45) Date of Patent: Nov. 26, 2019

(54) MOTOR USING COMPLEX MAGNETIC FLUX

(71) Applicant: KOREA ELECTRONICS TECHNOLOGY INSTITUTE, Seongnam-si, Gyeonggi-do (KR)

(72) Inventors: Jungmoo Seo, Goyang-si (KR); Youngkyoun Kim, Seoul (KR); Sehyun Rhyu, Bucheon-si (KR); Jeongjong Lee, Incheon (KR); Insoung Jung, Seoul (KR)

(73) Assignee: KOREA ELECTRONICS TECHNOLOGY INSTITUTE, Seongnam-si, Gyeonggi-do (KR)

(*) Notice: Subject to any disclaimer, the term of this patent is extended or adjusted under 35 U.S.C. 154(b) by 231 days.

(21) Appl. No.: 15/321,664

(22) PCT Filed: Sep. 19, 2014

(86) PCT No.: PCT/KR2014/008729
§ 371 (c)(1),
(2) Date: Dec. 22, 2016

(87) PCT Pub. No.: WO2016/003014
PCT Pub. Date: Jan. 7, 2016

(65) Prior Publication Data
US 2017/0214281 A1   Jul. 27, 2017

(30) Foreign Application Priority Data
Jul. 2, 2014   (KR) .................. 10-2014-0082235

(51) Int. Cl.
*H02K 1/27*   (2006.01)
*H02K 1/14*   (2006.01)
(Continued)

(52) U.S. Cl.
CPC .......... *H02K 1/2793* (2013.01); *H02K 1/145* (2013.01); *H02K 1/146* (2013.01); *H02K 1/2786* (2013.01);
(Continued)

(58) Field of Classification Search
CPC .... H02K 1/2793; H02K 1/2786; H02K 1/145; H02K 1/146; H02K 21/12; H02K 21/24; H02K 21/227; H02K 2201/12
See application file for complete search history.

(56) References Cited

U.S. PATENT DOCUMENTS

| 8,212,445 B2 * | 7/2012 | Ritchey | ................. | H02K 7/108 |
| | | | | 310/112 |
| 2002/0070627 A1 * | 6/2002 | Ward | ..................... | H02K 1/145 |
| | | | | 310/254.1 |

(Continued)

FOREIGN PATENT DOCUMENTS

| JP | 2007-236130 A | 9/2007 |
| JP | 2011-250689 A | 12/2011 |

(Continued)

OTHER PUBLICATIONS

International Search Report dated Apr. 7, 2015 in International Application No. PCT/KR2014/008729, filed Sep. 19, 2014.

*Primary Examiner* — Jue Zhang
(74) *Attorney, Agent, or Firm* — Knobbe Martens Olson & Bear LLP

(57) ABSTRACT

The described technology relates to a motor using a complex magnetic flux, which uses a radial magnetic flux and an axial magnetic flux together, thereby generating a larger torque in the same volume. The motor can also use a radial magnetic flux, an axial magnetic flux, and an oblique magnetic flux together, thereby generating a larger torque in the same volume.

6 Claims, 8 Drawing Sheets

(51) Int. Cl.
  *H02K 21/12* (2006.01)
  *H02K 21/22* (2006.01)
  *H02K 21/24* (2006.01)
(52) U.S. Cl.
  CPC ........... *H02K 21/12* (2013.01); *H02K 21/227* (2013.01); *H02K 21/24* (2013.01); *H02K 2201/12* (2013.01)

(56) References Cited

U.S. PATENT DOCUMENTS

| | | | | |
|---|---|---|---|---|
| 2005/0073212 | A1* | 4/2005 | Semones | H02K 21/24 310/216.008 |
| 2008/0136272 | A1* | 6/2008 | Ishikawa | H02K 1/145 310/58 |
| 2008/0278020 | A1* | 11/2008 | Ley | H02K 1/148 310/156.36 |
| 2009/0102314 | A1* | 4/2009 | Miyata | H02K 1/145 310/257 |
| 2013/0147288 | A1 | 6/2013 | Jack et al. | |
| 2014/0132121 | A1 | 5/2014 | Gan et al. | |
| 2014/0285048 | A1* | 9/2014 | Seo | H02K 1/2786 310/156.12 |
| 2015/0155748 | A1* | 6/2015 | Nord | H02K 1/145 310/156.02 |
| 2015/0311756 | A1* | 10/2015 | Sullivan | H02K 1/2793 310/12.14 |

FOREIGN PATENT DOCUMENTS

| | | |
|---|---|---|
| JP | 2014-500703 A | 1/2014 |
| KR | 10-2011-0045568 A | 5/2011 |
| KR | 2014-0116258 A | 10/2014 |
| WO | WO 2012/084905 A1 | 6/2012 |

* cited by examiner

[Fig. 1]
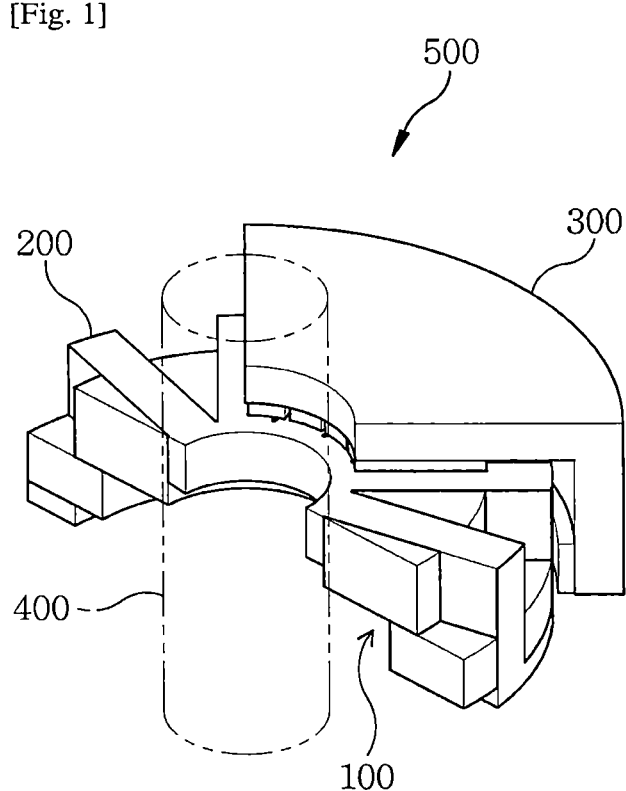
[Fig. 2]
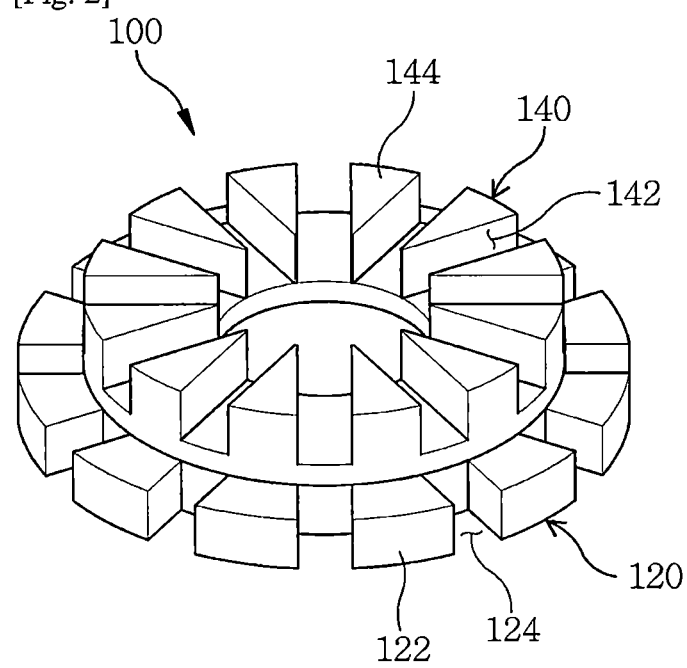

[Fig. 3]
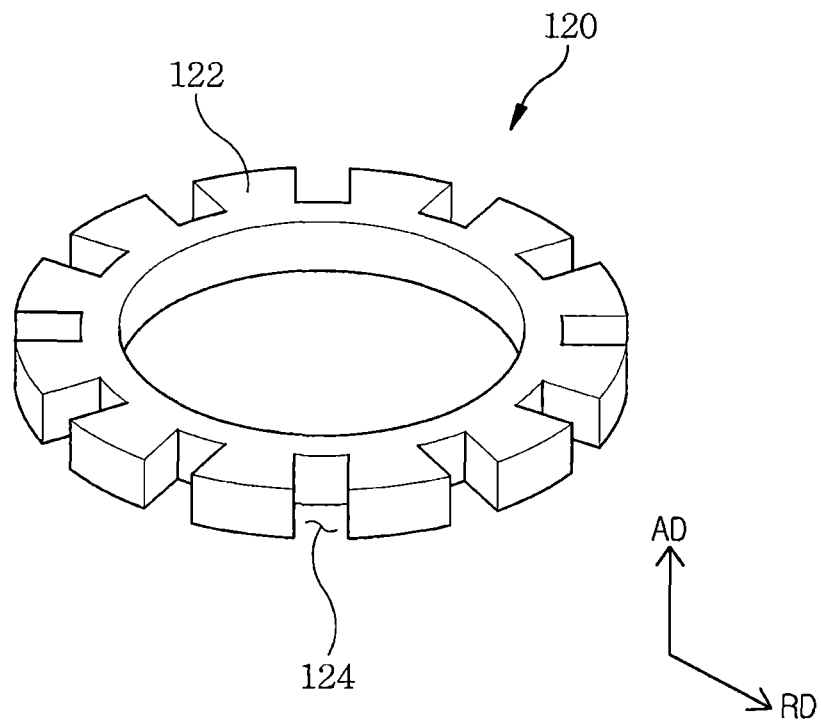
[Fig. 4]
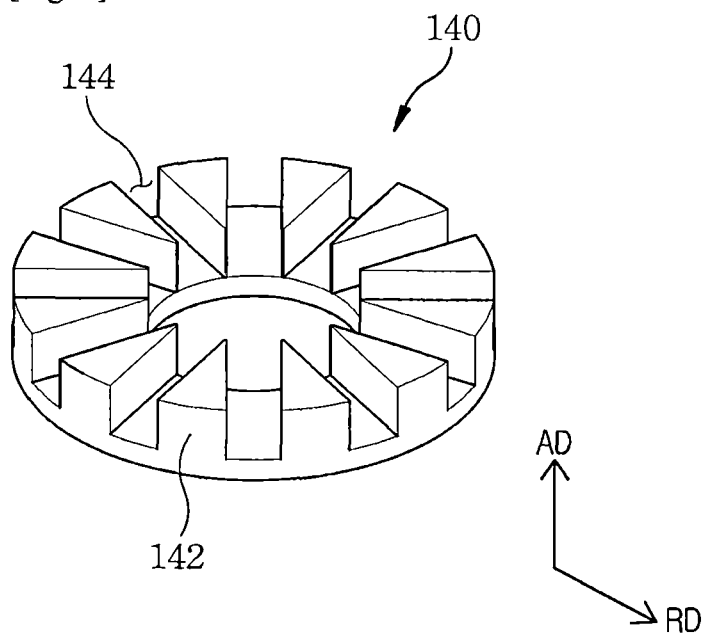

[Fig. 5]
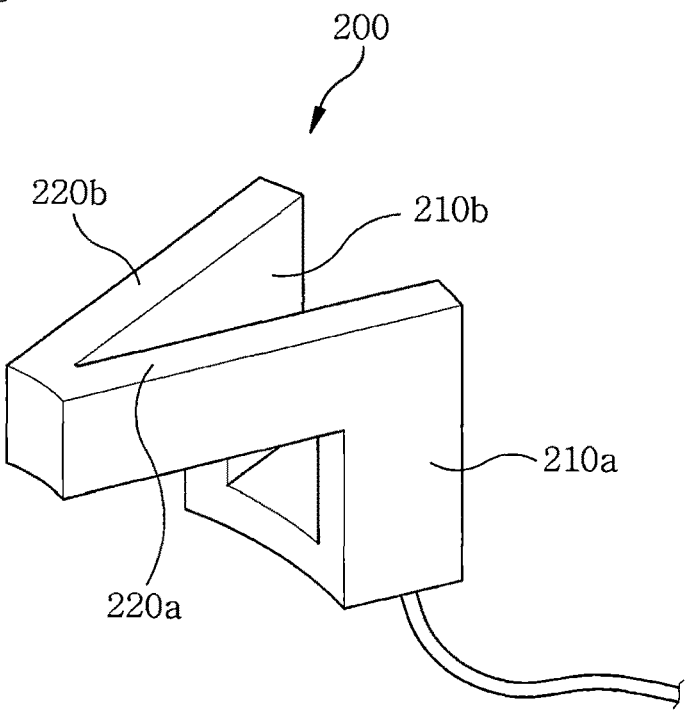
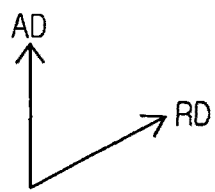
[Fig. 6]
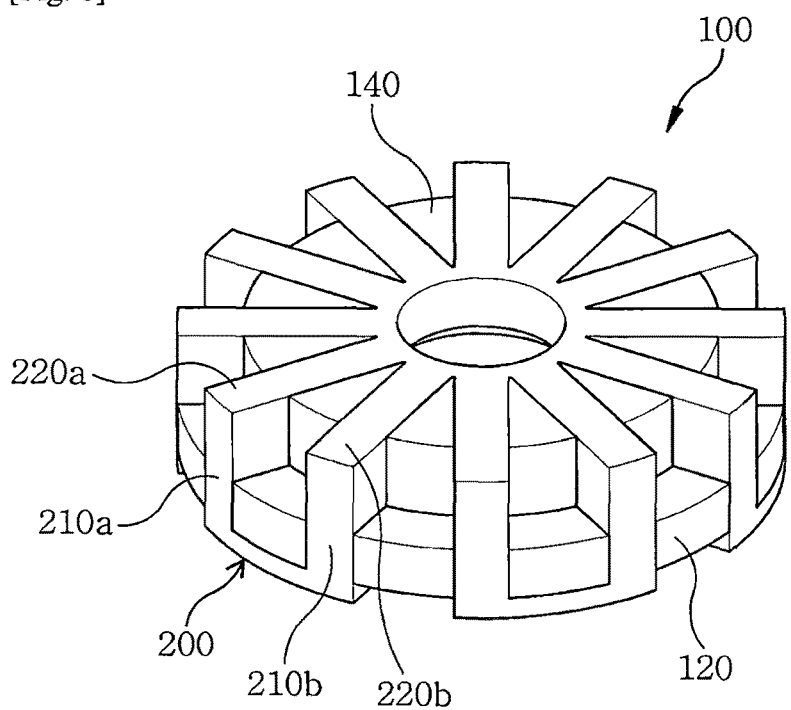

[Fig. 7]
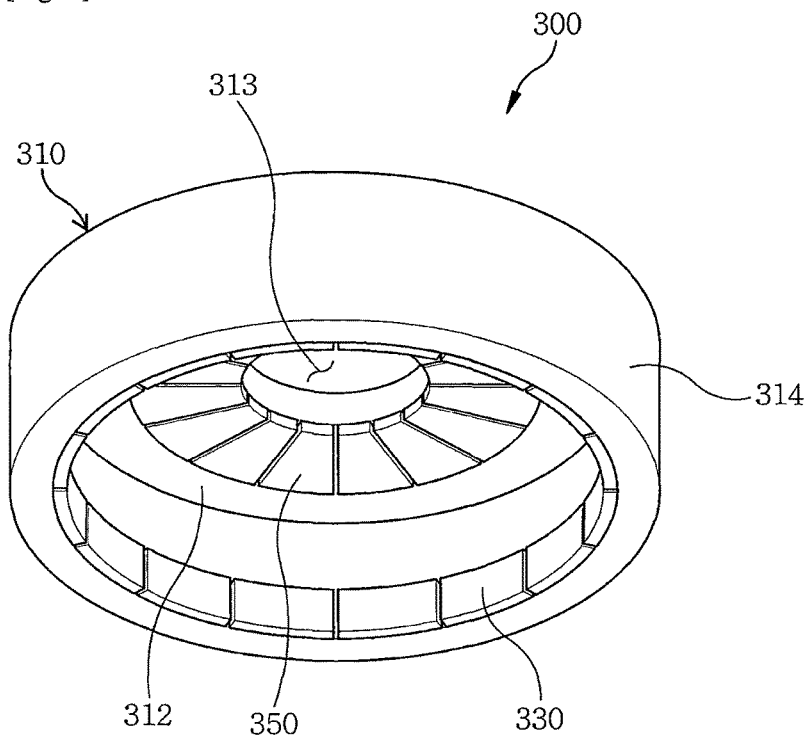
[Fig. 8]
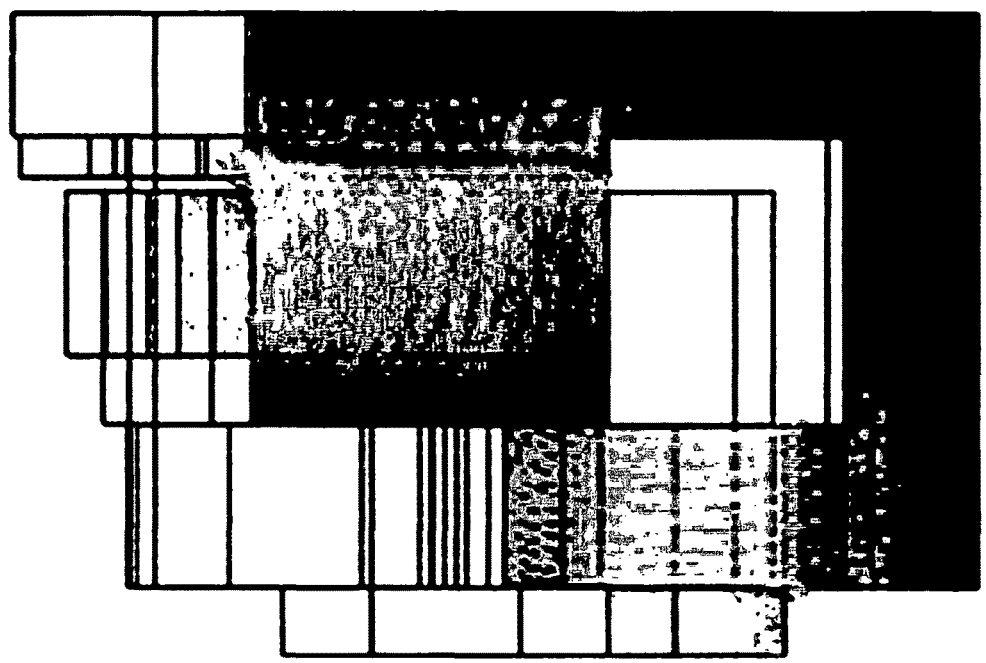

[Fig. 9]
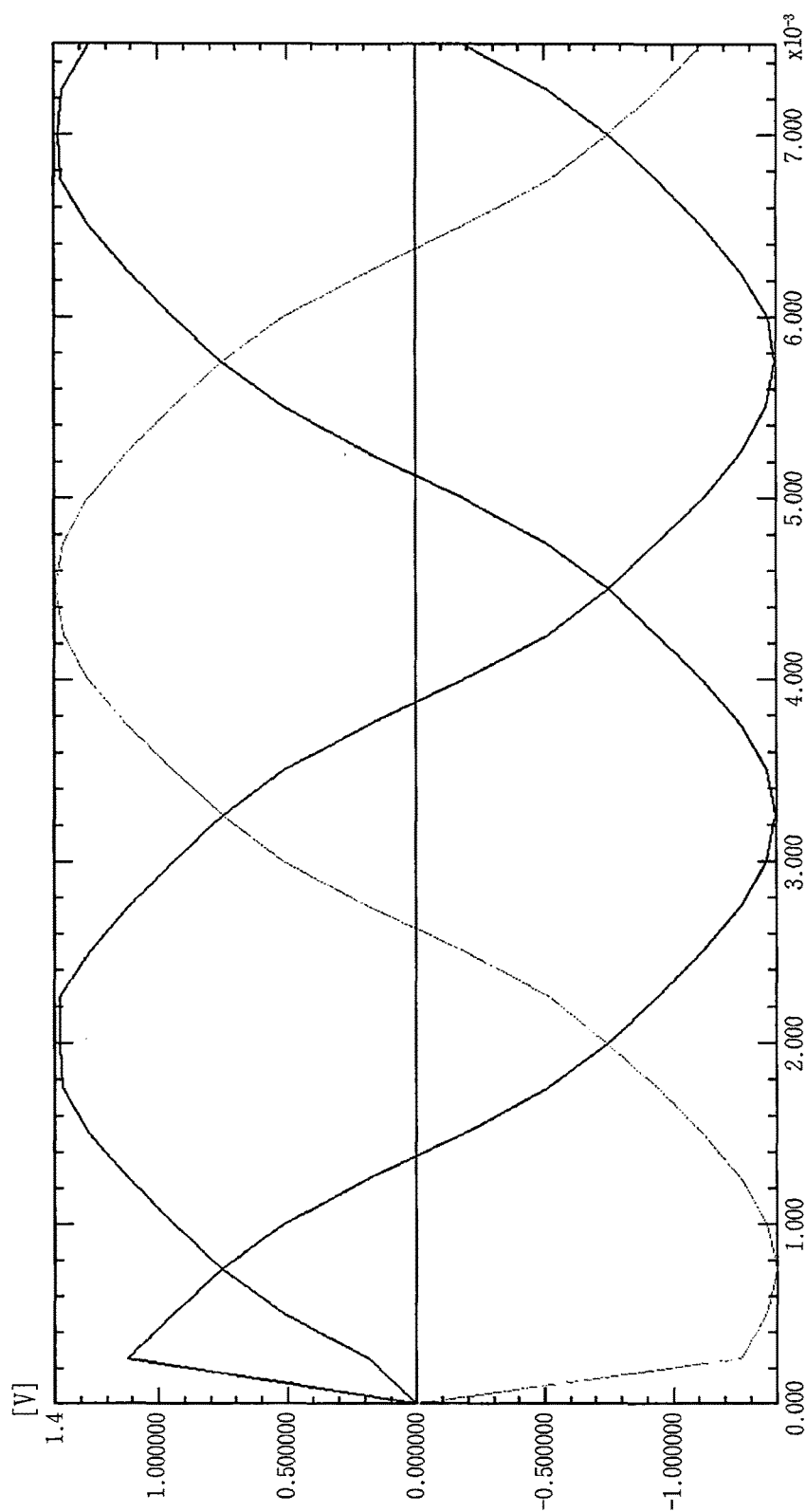

[Fig. 10]
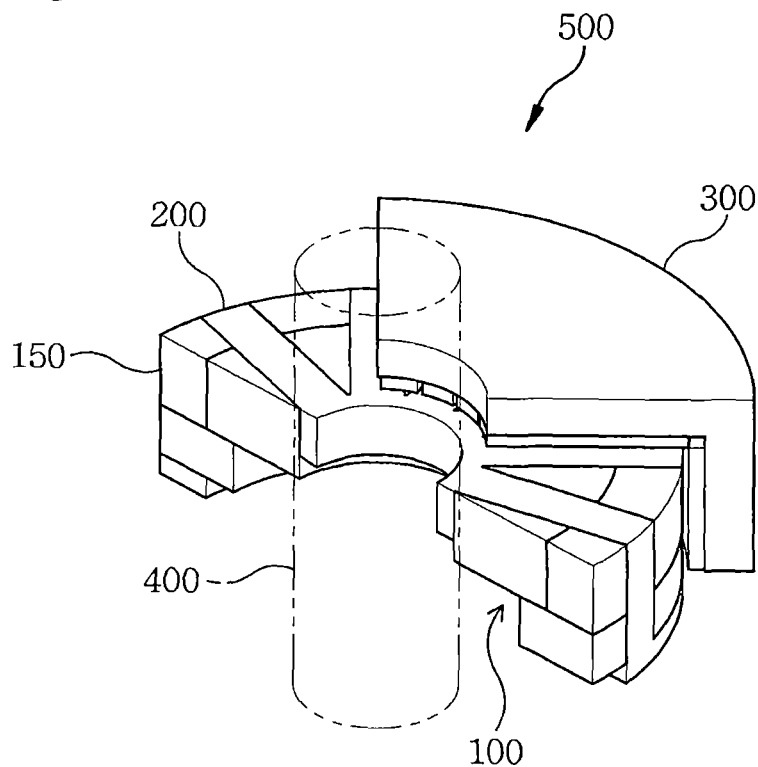
[Fig. 11]
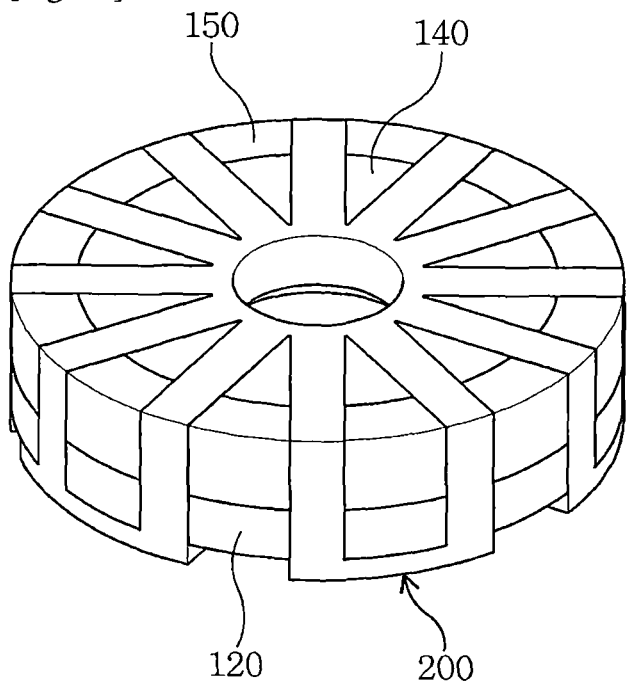

[Fig. 12]
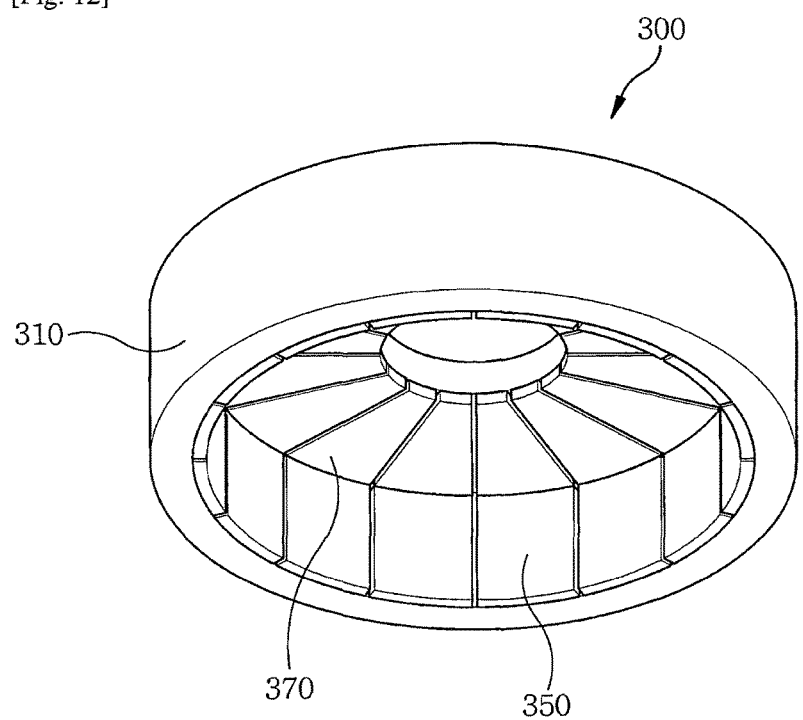
[Fig. 13]
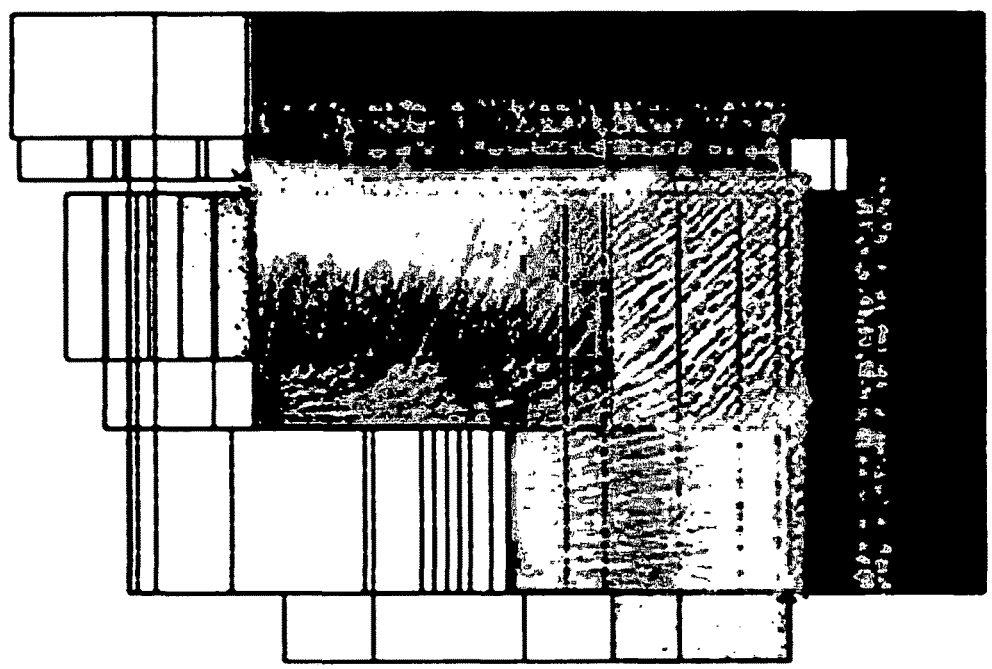

[Fig. 14]
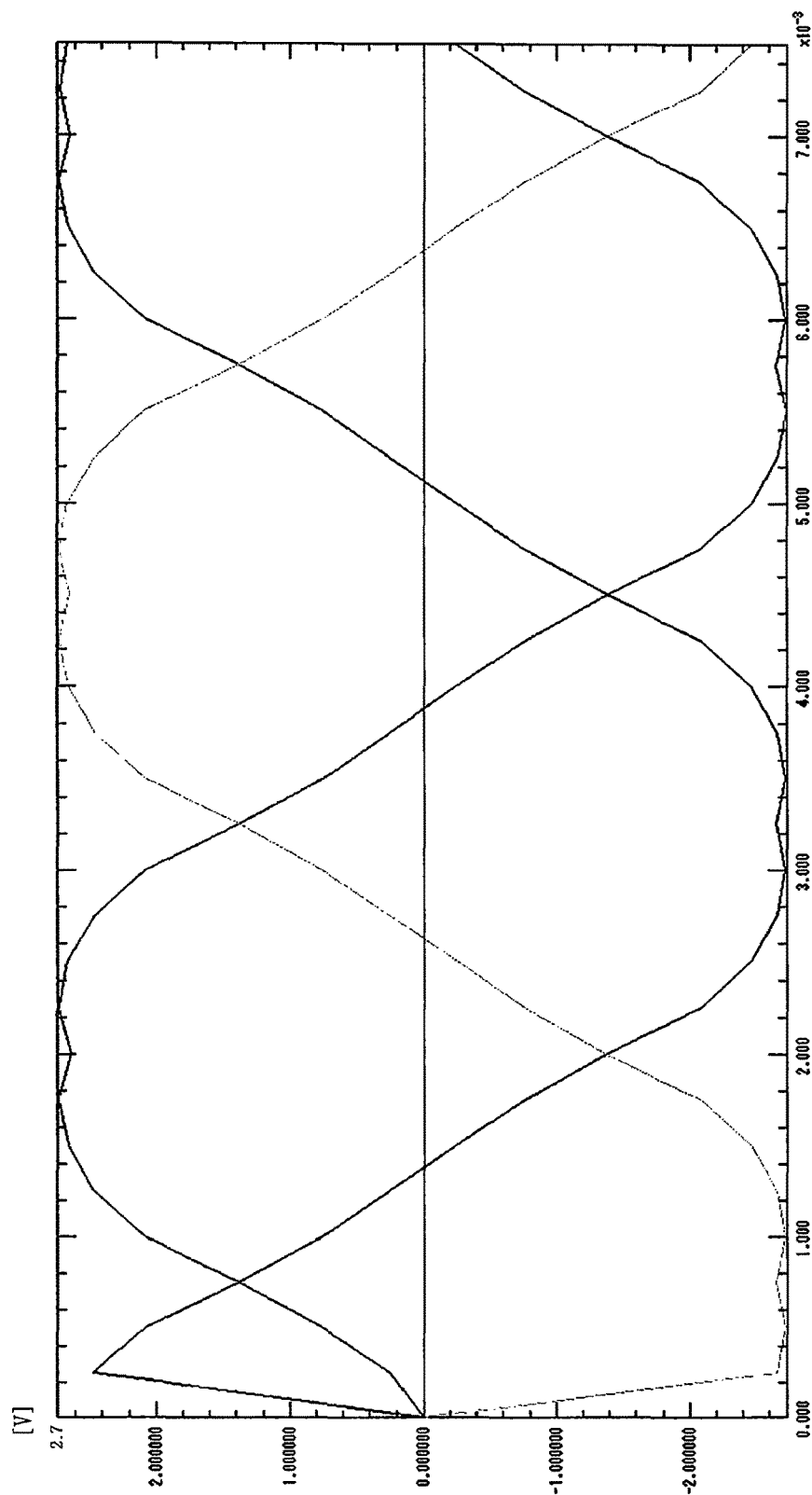

MOTOR USING COMPLEX MAGNETIC FLUX

FIELD

The present disclosure relates to a motor using a complex magnetic flux, and more particularly, to a motor using a radial magnetic flux and an axial magnetic flux, or the radial magnetic flux, the axial magnetic flux, and an oblique magnetic flux.

DESCRIPTION OF THE RELATED TECHNOLOGY

Generally, a motor may be defined as a device which converts electrical energy into rotational energy using the principle in which a force is generated in a direction perpendicular to a flux and a current when a magnetic field generated from a permanent magnet is perpendicular to a direction of the current flowing in a conducting wire.

A motor may typically include a stator on which a coil is wound, a rotor arranged adjacent to the stator and in which a permanent magnet is disposed, and a shaft configured to rotatably support the rotor.

The motor may be classified into a radial magnetic flux motor and an axial magnetic flux motor based on a direction of a magnetic flux emitted from a permanent magnet.

Since the radial magnetic flux motor includes a permanent magnet that generates a magnetic field only in a radial direction, there is a limitation in which an axial magnetic force is small such that an axial preload is needed to be applied to a bearing so as to axially support the rotor that is being rotated.

On the other hand, the axial magnetic flux motor generates a more than necessary axial magnetic force due to a permanent magnet that is mounted on the axial magnetic flux motor in an axial direction thereof.

To overcome such disadvantages of the radial magnetic flux motor and the axial magnetic flux motor, a motor using integrated windings capable of generating both an axial magnetic flux and a radial magnetic flux is disclosed in Korean Patent Application No. 2013-0029899, entitled "Radial and Axial Magnetic Flux Motor using Integrated Windings."

However, the radial and axial magnetic flux motor using integrated windings has problems in which torque determining the strength of a rotational force is small due to a limitation on the number of winding turns of the integrated windings and further an entire volume of the motor should be increased so as to increase the torque.

SUMMARY OF CERTAIN INVENTIVE ASPECTS

An object of the present disclosure is to provide a motor using a complex magnetic flux, which uses a radial magnetic flux and an axial magnetic flux together, or uses the radial magnetic flux, the axial magnetic flux, and an oblique magnetic flux in company with each other to be able to generate a larger torque in the same volume.

As one embodiment, a motor using a complex magnetic flux includes a stator including a first core formed by arranging first metal pieces in an axial direction and in which first core depressions are formed at regular intervals from an outer surface, and a second core arranged on the first core, formed by arranging second metal pieces in a direction parallel to a shaft, and in which second core depressions corresponding to the first core depressions are formed from an upper surface; a coil including a first coil part arranged in each of the first core depressions parallel to the shaft, and a second coil part arranged in each of the second core depressions in a direction perpendicular to the shaft; a rotor including a housing case having an upper plate and a side plate, first permanent magnets arranged on an inner surface of the side plate of the housing case to face the first core, and second permanent magnets arranged on a lower surface of the upper plate to face the second core; and a shaft configured to rotatably support the rotor.

The second core depressions of the motor using a complex magnetic flux are radially formed from a center of the second core.

A height of each of the first permanent magnets of the motor using a complex magnetic flux is formed to be the same as that of the first core, and a plane area of the second permanent magnets is formed to be the same as a plane area of the second core.

The first and second permanent magnets of the motor using a complex magnetic flux are formed by alternately magnetizing an N pole and an S pole.

The first core of the motor using a complex magnetic flux is formed in a ring shape, an outer surface of the first core is formed with a first diameter, an opening is formed in a central portion of the second core, and an outer surface of the second core is formed with a second diameter that is less than the first diameter.

As one embodiment, a motor using a complex magnetic flux includes a stator including a first core formed by arranging first metal pieces in an axial direction and in which first core depressions are formed at regular intervals from an outer surface, a second core arranged on the first core, formed by arranging second metal pieces in a direction parallel to a shaft, and in which second core depressions corresponding to the first core depressions are formed from an upper surface, and an insert core arranged on an upper surface of the first core in company with the second core; a coil including a first coil part arranged in each of the first core depressions parallel to the shaft, and a second coil part arranged in each of the second core depressions in a direction perpendicular to the shaft; a rotor including a housing case having an upper plate and a side plate, first permanent magnets arranged on an inner surface of the side plate of the housing case to face a lateral surface of the first core and a lateral surface of the insert core, and second permanent magnets arranged on a lower surface of the upper plate to face an upper surface of the second core and an upper surface of the insert core; and a shaft configured to rotatably support the rotor.

The insert core of the motor using a complex magnetic flux includes a magnetic core configured to concentrate a magnetic flux by passing an oblique magnetic flux that is generated at a corner at which the first and second permanent magnets are arranged adjacent to each other.

The magnetic core of the motor using a complex magnetic flux includes a soft magnetic composite (SMC) type core.

In accordance with the motor using a complex magnetic flux according to the present disclosure, a core of a stator is formed in two stages, a structure of a permanent magnet of a rotor is improved, and an axial magnetic flux, a radial magnetic flux, or an oblique magnetic flux is actively used so that there is an effect in which torque of the motor may be more improved as well as a weight and a volume thereof may be more decreased.

BRIEF DESCRIPTION OF THE DRAWINGS

FIG. 1 is a cross-sectional view of a motor using a complex magnetic flux according to one embodiment of the present disclosure.

FIG. 2 is a perspective view illustrating a stator of FIG. 1.

FIG. 3 is a perspective view illustrating a first core of the stator of FIG. 2.

FIG. 4 is a perspective view illustrating a second core of the stator of FIG. 2.

FIG. 5 is a perspective view illustrating a coil of FIG. 1.

FIG. 6 is a perspective view illustrating a coupled state of the stator and the coil which are shown in FIG. 1.

FIG. 7 is a perspective view illustrating the rotor of the motor using a complex magnetic flux, which is shown in FIG. 1.

FIG. 8 is a vector diagram illustrating a magnetic flux density of the motor using a complex magnetic flux, which is shown in FIG. 1.

FIG. 9 is a graph illustrating a counter electromotive voltage of the motor using a complex magnetic flux, which is shown in FIG. 1.

FIG. 10 is a cross-sectional diagram of a motor using a complex magnetic flux according to another embodiment of the present disclosure.

FIG. 11 is a perspective view illustrating a stator, a coil, and an insert core which are shown in FIG. 10.

FIG. 12 is a perspective view illustrating the rotor of FIG. 10.

FIG. 13 is a vector diagram illustrating a magnetic flux density of the motor using a complex magnetic flux, which is shown in FIG. 10.

FIG. 14 is a graph illustrating a counter electromotive voltage of the motor using a complex magnetic flux, which is shown in FIG. 10.

DETAILED DESCRIPTION OF CERTAIN INVENTIVE EMBODIMENTS

In the following description, it should be noted that only parts necessary for understanding embodiments of the present disclosure will be described, and the remaining parts will be omitted so as not to obscure the gist of the present disclosure.

The terms and words used in the present disclosure and the claims should not be construed as limited to ordinary or dictionary meanings, and these should be construed in meaning and concept in accordance with the technical spirit of the present disclosure based on the principle that the inventor can appropriately define the concepts of the terms to describe the invention in the best way. Therefore, the embodiments described herein and configurations shown in the drawings are merely preferred embodiments of the present disclosure, and these are not representative of all the technical spirit of the present disclosure so that it should be understood that various equivalents and modifications may be substituted for them at the time of filing of the present application.

FIG. 1 is a cross-sectional view of a motor using a complex magnetic flux according to one embodiment of the present disclosure.

Referring to FIG. 1, a motor 500 using a complex magnetic flux includes a stator 100, a coil 200, a rotor 300, and a shaft 400.

FIG. 2 is a perspective view illustrating the stator of FIG. 1. FIG. 3 is a perspective view illustrating a first core of the stator of FIG. 2. FIG. 4 is a perspective view illustrating a second core of the stator of FIG. 2.

Referring to FIG. 2, the stator 100 includes a first core 120 and a second core 140.

Referring to FIGS. 2 and 3, the second core 140 is arranged on an upper surface of the first core 120, and the first and second cores 120 and 140 are firmly coupled to each other.

The first core 120 is formed in a ring shape in which an inner diameter has a first diameter and an outer diameter has a second diameter that is greater than the first diameter.

The ring-shaped first core 120 is formed by stacking or arranging a plurality of first metal pieces 122, each of which has a thin thickness, in an axial direction AD. Each of the first metal pieces 122 may be, for example, a silicon steel sheet.

A plurality of first core depressions 124 are formed in an outer surface of the first metal pieces 122 having a ring shape in a direction from the outer surface toward a center of the first core 120.

Each of the first core depressions 124 is radially formed from a center of each of the first metal pieces 122 and a plurality of first core depressions 124 are formed at a regular interval along an outer circumferential surface thereof.

In one embodiment of the present disclosure, each of the first core depressions 124 formed in the first core 120 provides a space into which the coil 200, which will be described below, is inserted and serves to form an entire size of the motor 500 using a complex magnetic flux to be in a more compact size and to fix the coil 200 to a predetermined position, thereby enabling a radial magnetic flux to be generated from the coil 200.

In one embodiment of the present disclosure, it has been shown and described that the first core 120 is formed by stacking the first metal pieces 122, in which the first core depressions 124 are formed, in the axial direction AD, but alternatively, it is possible to form the first core depressions 124 by stacking the ring-shaped first metal pieces 122 in the axial direction AD to form the first core 120, and then processing an outer circumferential surface of the first core 120 through a machine tool and the like.

Referring to FIGS. 2 and 4, the second core 140 is formed in a ring shape having an inner diameter and an outer diameter.

In one embodiment of the present disclosure, the outer diameter of the ring-shaped second core 140 is formed to be greater than the inner diameter of the first core 120 and to be less than the outer diameter thereof, and the second core 140 is arranged on the upper surface of the first core 120.

The ring-shaped second core 140 is formed by stacking or arranging a plurality of second metal pieces 142 in a radial direction RD perpendicular to the axial direction AD. Each of the second metal pieces 142 may be, for example, a silicon steel sheet.

A plurality of second core depressions 144 are formed on an upper surface of the second core 140 in a direction toward a lower surface of the second core 140 opposite to the upper surface thereof.

In one embodiment of the present disclosure, each of the second core depressions 144 is formed at a position corresponding to that of each of the first core depressions 124 of the first core 120, and each of the first core depressions 124 of the first core 120 and each of the second core depressions 144 of the second core 140 are formed to be the same size, for example.

For example, when each of the second core depressions 144 of the second core 140 is formed at a position and with a size that are the same as those of each of the first core depressions 124 of the first core 120, it is radially formed from a center of the second core 140 like each of the first core depressions 124.

In one embodiment of the present disclosure, each of the second core depressions 144 formed in the second core 140 provides a space into which the coil 200, which will be described below, is inserted and serves to form an entire size of the motor 500 using a complex magnetic flux to be in a compact size and to fix the coil 200 to a predetermined position, thereby enabling an axial magnetic flux to be generated from the coil 200.

In one embodiment of the present disclosure, it has been shown and described that the second core 140 is formed by stacking the second metal pieces 142, in which the second core depressions 144 are formed, in the radial direction RD, but alternatively, it is possible to form the second core depressions 144 by winding a silicon steel sheet in the form of a spring and then processing an upper surface of the wound silicon steel sheet through a machine tool and the like.

FIG. 5 is a perspective view illustrating the coil of FIG. 1. FIG. 6 is a perspective view illustrating a coupled state of the stator and the coil which are shown in FIG. 1.

Referring to FIGS. 5 and 6, the coil 200 includes first coil parts 210*a* and 210*b*, and second coil parts 220*a* and 220*b*.

The first coil parts 210*a* and 210*b* are inserted into the first core depressions 124 of the first core 120 and arranged in a direction parallel to the axial direction AD such that a current flows in the first coil parts 210*a* and 210*b* in a direction parallel to the axial direction AD and thus a magnetic field toward the radial direction RD is generated from the first coil parts 210*a* and 210*b*.

The second coil parts 220*a* and 220*b* are inserted into the second core depressions 144 and arranged in a direction parallel to the radial direction RD such that a current flows in the second coil parts 220*a* and 220*b* in a direction parallel to the radial direction RD and thus a magnetic field toward the axial direction AD is generated from the second coil parts 220*a* and 220*b*.

In one embodiment of the present disclosure, the coil 200 including the first and second coil parts 210*a*, 210*b*, 220*a*, and 220*b* may be formed by winding an electrical wire through a jig and the like to couple the wound electrical wire to the first and second cores 120 and 140, or by directly winding the electrical wire on the first and second cores 120 and 140.

To form the coil 200 including the first coil parts 210*a* and 210*b* and the second coil parts 220*a* and 220*b*, a coil is first arranged in the axial direction AD to form the first coil part 210*a*, and then an end of the first coil part 210*a* is bent in a 'V' shape in the radial direction RD to form the second coil parts 220*a* and 220*b*. Thereafter, the coil at an end of the second coil part 220*b* is bent in the axial direction AD to form the first coil part 210*b*, and such processes described above are repeated by the predetermined number of wiring turns to form the coil 200 shown in FIG. 5.

Referring to FIG. 6, the coil 200 including the first coil parts 210*a* and 210*b* and the second coil parts 220*a* and 220*b* is coupled to the first core 120 and the second core 140 of the stator 100. The coil 200 may be coupled to the first core 120 and the second core 140 by means of, for example, an adhesive and the like so as not to be separated from the first core 120 and the second core 140.

FIG. 7 is a perspective view illustrating the rotor of the motor using a complex magnetic flux, which is shown in FIG. 1.

Referring to FIGS. 1 and 7, the rotor 300 rotates with respect to the stator 100 in response to an axial magnetic field and a radial magnetic field which are generated from the coil 200 that is coupled to the first and second cores 120 and 140 of the stator 100.

The rotor 300 includes a housing case 310, a first permanent magnet 330, and a second permanent magnet 350.

The housing case 310 includes an upper plate 312 and a side plate 314, and, for example, the upper plate 312 and the side plate 314 are integrally formed.

The upper plate 312 is formed in a circular shape when viewed on a plane, and an opening 313 is formed in a center of the upper plate 312.

The housing case 310 may be formed by press processing a metal plate so as to prevent magnetic flux leakage from occurring.

The first permanent magnet 330 may be arranged in a ring shape along an inner surface of the side plate 314 of the housing case 310, and may be formed by alternately magnetizing an N pole and an S pole.

A height of the first permanent magnet 330 is formed to be lower than that of the side plate 314, and is arranged at a position facing the first core 120. The height of the first permanent magnet 330 is formed to be substantially the same as a thickness of the first core 120.

The second permanent magnet 350 is formed on an inner surface of the upper plate 312 of the housing case 310. The second permanent magnet 350 is arranged along a periphery of the opening in an inner surface of the upper plate 312, and is formed by alternately magnetizing an N pole and an S pole.

In one embodiment of the present disclosure, the number of the N and S poles of the first permanent magnet 330 is the same as that of the N and S poles of the second permanent magnet 350.

The forming position, the plane area, and the shape of the second permanent magnet 350 may be formed to be substantially the same as those of the second core 140 of the stator 100.

The rotor 300 shown in FIG. 7 covers the stator 100 to which the coil 200 shown in FIG. 6 is coupled as shown in FIG. 1, and a bearing is arranged inside the stator 100. The shaft 400 is rotatably coupled by means of the bearing, and is coupled to the opening formed in the upper plate 312 of the rotor 300.

FIG. 8 is a vector diagram illustrating a magnetic flux density of the motor using a complex magnetic flux, which is shown in FIG. 1. FIG. 9 is a graph illustrating a counter electromotive voltage of the motor using a complex magnetic flux, which is shown in FIG. 1.

Referring to FIG. 8, as shown in the vector diagram illustrating a magnetic flux density of the motor using a complex magnetic flux, an axial magnetic flux and a radial magnetic flux generated from the first and second permanent magnets 330 and 350 are applied to the coil 200 at 90 degrees to each other. Further, referring to FIG. 9, the motor 500 using a complex magnetic flux, which is shown in FIG. 1, has a counter electromotive voltage of about 1.4 volts (V) in proportion to torque of the motor. In comparison with a counter electromotive voltage of about 0.5 V in a conventional motor with specifications the same as those of the motor 500, the motor 500 using a complex magnetic flux has an improved torque.

Also, the conventional motor with the same specifications has a total weight of about 550 grams (g), whereas the motor 500 using a complex magnetic flux according to the present disclosure has a total weight of only about 420 g and also a volume less than that of the conventional motor. The reason for this is that a core of a stator employed in the conventional motor is changed into the first and second core 120 and 140, each of which has an improved structure.

FIG. 10 is a cross-sectional diagram of a motor using a complex magnetic flux according to another embodiment of the present disclosure. The motor using a complex magnetic flux, which is shown in FIG. 10, is substantially the same as the motor using a complex magnetic flux, which is shown in FIG. 1, except for an insert core, and first and second permanent magnets. Therefore, repetitive description for the same components will be omitted, and the same name and reference number will be assigned to the same components.

Referring to FIG. 10, the motor using a complex magnetic flux includes a stator 100 having an insert core 150, a coil 200, and a rotor 300.

FIG. 11 is a perspective view illustrating the stator, the coil, and the insert core which are shown in the FIG. 10.

Referring to FIGS. 10 and 11, the coil 200 is coupled to the stator 100 in which a second core 140 is arranged on an upper surface of a first core 120, and the insert core 150 is arranged at a portion, at which the second core 140 is not arranged, of the upper surface of the first core 120. Therefore, the insert core 150 is arranged in a form of being surrounded by the coil 200, the first core 120, and the second core 140.

The insert core 150 includes a magnetic core, and further, in one embodiment of the present disclosure, it includes a soft magnetic composite (SMC).

An outer surface of the insert core 150 is arranged to be substantially coplanar with an outer surface of the first core 120, and an upper surface of the insert core 150 is arranged to be substantially coplanar with an upper surface of the second core 140.

FIG. 12 is a perspective view illustrating the rotor of FIG. 10.

Referring to FIG. 12, the rotor 300 rotates with respect to the stator 100 in response to an axial magnetic field and a radial magnetic field which are generated from the coil 200 that is coupled to the first and second cores 120 and 140 of the stator 100.

The rotor 300 includes a housing case 310, a first permanent magnet 350, and a second permanent magnet 370.

The housing case 310 includes an upper plate 312 and a side plate 314, and, for example, the upper plate 312 and the side plate 314 are integrally formed.

The upper plate 312 is formed in a circular shape when viewed on a plane, and an opening 313 is formed in a center of the upper plate 312.

The housing case 310 may be formed by press processing a metal plate so as to prevent magnetic flux leakage from occurring.

The first permanent magnet 350 is arranged in a ring shape along an inner surface of the side plate 314 of the housing case 310, and may be formed by alternately magnetizing an N pole and an S pole.

The first permanent magnet 350 is formed with a height substantially the same as that of the side plate 314. Therefore, a lower end of the first permanent magnet 350 is aligned with a lower end of the side plate 314, and an upper end facing the lower end of the first permanent magnet 350 is arranged adjacent to a corner between the upper plate 312 and the side plate 314 of the housing case 310.

The second permanent magnet 370 is formed on an inner surface of the upper plate 312 of the housing case 310, and is arranged along a periphery of the opening in the inner surface of the upper plate 312. The second permanent magnet 370 is formed by alternately magnetizing an N pole and an S pole.

In one embodiment of the present disclosure, the number of the N and S poles of the first permanent magnet 350 is the same as that of the N and S poles of the second permanent magnet 370.

An outer surface, which is formed in a doughnut shape, of the second permanent magnet 370 is arranged adjacent to the corner between the upper plate 312 and the side plate 314 of the housing case 310. That is, the outer surface of the second permanent magnet 370 is arranged adjacent to the upper end of the first permanent magnet 350, and first permanent magnets 350, which are arranged adjacent to each other, are formed with the same polarities as those of second permanent magnets 370.

In one embodiment of the present disclosure, when an area of each of the first permanent magnet 350 and the second permanent magnet 370 is increased as shown in FIG. 12, an amount of the magnetic flux may be significantly increased in comparison with the first permanent magnet 330 and the second permanent magnet 350 which are shown in FIG. 7.

Also, when the area of each of the first and second permanent magnets 350 and 370 is increased, an oblique magnetic flux is generated in a direction from the corner at which the first and second permanent magnets 350 and 370 meet each other toward the insert core 150. Therefore, the oblique magnetic flux is concentrated at the insert core 150 and then passes through the insert core 150 to be applied to the coil 200 such that torque of the motor using a complex magnetic flux may be increased in comparison with torque of a motor only using an axial magnetic flux and a radial magnetic flux.

FIG. 14 is a graph illustrating a counter electromotive voltage of the motor using a complex magnetic flux, which is shown in FIG. 10.

Referring to FIG. 14, when the insert core 150 is arranged on the first core 120, and the first and second permanent magnets 350 and 370, each of which is increased in area, are arranged in the rotor 300, the motor using a complex magnetic flux has a maximum counter electromotive voltage of about 2.7 V and thus the counter electromotive voltage is significantly increased in comparison with the counter electromotive voltage of the motor, which is not provided with the insert core as shown in FIG. 9, using a complex magnetic flux. Consequently, when the insert core 150, and the first and second permanent magnets 350 and 370, each of which is increased in area, are included, the torque of the motor using a complex magnetic flux may be dramatically increased.

As described in detail above, a core of a stator is formed in two stages, a structure of a permanent magnet of a rotor is improved, and an axial magnetic flux, a radial magnetic flux, or an oblique magnetic flux is actively used so that there is an effect in which torque of a motor may be more improved as well as a weight and a volume of the motor may be more decreased.

Meanwhile, the embodiments disclosed in the drawings are merely specific examples for aid in understanding, and these are not intended to limit the scope of the present disclosure. It will be apparent to those skilled in the art that other modifications based on the technical spirit of the present disclosure are possible in addition to the embodiments disclosed herein.

The present disclosure may be used in a motor and the like which generate a rotational force using a magnetic flux in a direction of an axial magnetic flux and a radial magnetic flux.

The invention claimed is:

1. A motor comprising:
a rotation shaft extending along an axis and configured to rotate about the axis;
a first annular stator core comprising a first central hole configured to receive a first portion of the rotation shaft, wherein the first annular stator core has a first outer diameter;
a second annular stator core comprising a second central hole configured to receive a second portion of the rotation shaft different from the first portion, wherein the second annular stator core is placed over the first annular stator core such that the first central hole and the second central hole are aligned to receive the first and second portions of the rotation shaft therethrough, wherein the second annular stator core has a second outer diameter that is less than the first outer diameter such that a first peripheral portion of the first annular stator core does not overlap the second annular stator core when viewed in a direction parallel to the axis of the rotation shaft;
a coil disposed around at least a portion of the first annular stator core and at least a portion of the second annular stator core; and
a rotor comprising an upper plate disposed over the first and second annular stator cores, a third central hole formed through the upper plate and configured to receive the rotation shaft, and a cylindrical side wall surrounding the first and second annular stator cores when viewed in the direction parallel to the axis of the rotation shaft,
wherein the second annular stator core comprises a plurality of depressions recessed from an upper surface of the second annular stator core, wherein the plurality of depressions comprise a first depression extending along a first radial direction of the second annular stator and a second depression extending along a second radial direction of the second annular stator core that is different from the first radial direction,
wherein the coil comprises a first segment received in the first depression and extending along the first radial direction, a second segment received in the second depression and extending along the second radial direction, and a third segment interconnecting the first segment and the second segment, and
wherein at least a part of the third segment extends under the first annular stator core along the first peripheral portion while not overlapping the second annular stator core when viewed in the direction parallel to the axis of the rotation shaft.

2. The motor of claim 1, wherein the second depression is radially formed from a center of the second annular stator core.

3. The motor of claim 1, further comprising a first set of permanent magnets coupled to an inner surface of the cylindrical side wall, and a second set of permanent magnets disposed under the upper plate to face the second annular stator core.

4. The motor of claim 1, further comprising
one or more insert cores arranged over the first peripheral portion of the first annular stator core.

5. The motor of claim 4, wherein each of the one or more insert cores includes a magnetic core configured to concentrate a magnetic flux by passing an oblique magnetic flux that is generated at a corner at which the first set of the permanent magnets and the second set of permanent magnets are arranged adjacent to each other.

6. The motor of claim 5, wherein the magnetic core includes a soft magnetic composite (SMC) type core.

* * * * *